UNITED STATES PATENT OFFICE 2,019,697

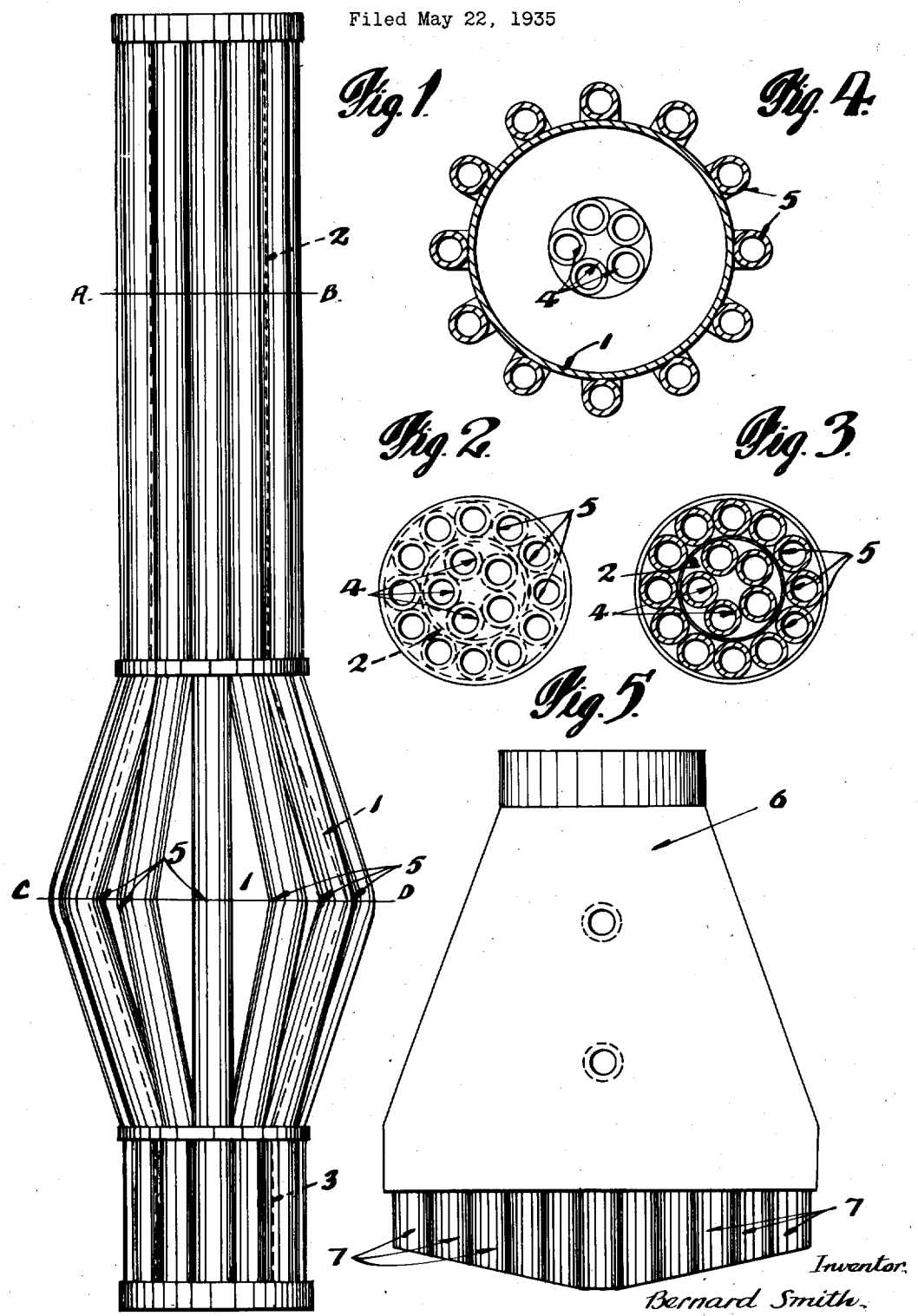

EXHAUST SILENCER FOR INTERNAL COMBUSTION ENGINES

Bernard Smith, Headingley, Leeds, England

Application May 22, 1935, Serial No. 22,910
In Great Britain May 22, 1934

4 Claims. (Cl. 137—160)

This invention relates to exhaust silencers for internal combustion engines, the chief object being the provision of a new or improved exhaust silencer of simple and efficient construction.

According to the invention, the exhaust silencer which is connected directly to the engine exhaust comprises a plurality of small tubes nested or bunched together to produce a "honeycomb" structure whereby the exhaust gases are split up and rapidly cooled so as to reduce back pressure and noise to a minimum.

Thus the exhaust silencer may comprise an inner series of small tubes delivering into an expansion chamber, and an outer series of small tubes surrounding the said inner series and following the external shape of the expansion chamber. The outlet of the expansion chamber may discharge directly into a further inner series of small tubes nested or bunched together, and the exit ends of the outer series of small tubes may be arranged around said second or further inner series. The exit ends of the outer series of small tubes and also those of the second inner series of small tubes may discharge into a common fish tail outlet member and the exit of the fish tail outlet chamber may be afforded by a series of short tubes.

The inner series of small tubes may be enclosed within a larger tube, and the outer series of small tubes may be arranged around the said larger tube, whilst the inner tubes may be welded together and to the inside of the larger tube and the outer small tubes may be welded to said larger tube.

In order that the invention may be clearly understood and readily carried into effect, the same will now be more fully described with reference to and by the aid of the embodiment illustrated in the accompanying drawing; wherein:—

Figure 1 is a plan view of the exhaust silencer.

Figure 2 is an elevation of one end of the exhaust silencer.

Figures 3 and 4 are transverse sections taken on the lines A. B. and C. D, respectively of Figure 1.

Figure 5 is a plan view of a fish tail outlet which can be applied to the discharge end of the silencer shown in Figures 1 to 4, inclusive.

Referring more particularly to Figures 1 to 4 of the drawing, the silencer comprises an expansion chamber 1 of "bulbous" form having an inlet pipe 2 and a shorter exhaust pipe 3. Both the inlet pipe 2 and exhaust pipe 3 are divided internally to afford a plurality of longitudinal passages for the exhaust gases, and this is effected by welding in each of said pipes 2 and 3 an annular series of small tubes 4, the said tubes 4 of each series being welded together at the ends side by side in a circle and to the inner wall or surface of the enclosing or surrounding pipes 2 or 3 as the case may be, whilst the length of said tubes 4 is the same as the enclosing pipes 2 or 3 so that they do not project beyond the ends of the latter into the chamber 1. A further annular series of small diameter tubes 5 is welded to the outside of the pipes 2 and 3 and extends the full length of the silencer, said tubes 5 being spaced apart where they pass over the bulbous expansion chamber 1 and follow the contour thereof.

The "honeycomb" structure afforded by the inner and outer series of small diameter tubes bunched or nested together on both the inlet and outlet ends of the expansion chamber, and the separating of the outer small tubes where they pass over or around said chamber ensure splitting up and rapid cooling of the exhaust gases so that back pressure and noise are reduced to a minimum.

The flat "fish-tail" 6 may be applied to the outlet end of the silencer, and this fish-tail 6 has its outlet afforded by a plurality of short small diameter tubes 7 which ensure a further splitting up of the expanded gases before discharge to atmosphere.

I claim:—

1. An exhaust silencer comprising an inner series of small tubes delivering into an expansion chamber, and an outer series of small tubes surrounding the said inner series and following the external shape of the expansion chamber.

2. An exhaust silencer according to claim 1, wherein the outlet of the expansion chamber discharges directly into a further inner series of small tubes nested or bunched together, and in which the exit ends of the outer series of small tubes are arranged around said second or further inner series.

3. An exhaust silencer comprising an inner series of small tubes delivering into an expansion chamber, an outer series of small tubes surrounding the inner series and following the external shape of the expansion chamber, the outlet of the expansion chamber discharging directly into a further inner series of small tubes nested or bunched together, the exit ends of the outer series of small tubes being arranged around the second or further inner series, the outlet ends of the outer series of small tubes and the outlet ends of the second inner series of small tubes discharging into a common fish-tail outlet member having its exit provided with a series of small tubes.

4. An exhaust silencer according to claim 3, wherein each inner series of small tubes is enclosed within a larger tube, and the outer series of small tubes is arranged around the said larger tube.

BERNARD SMITH.